Figure 1:
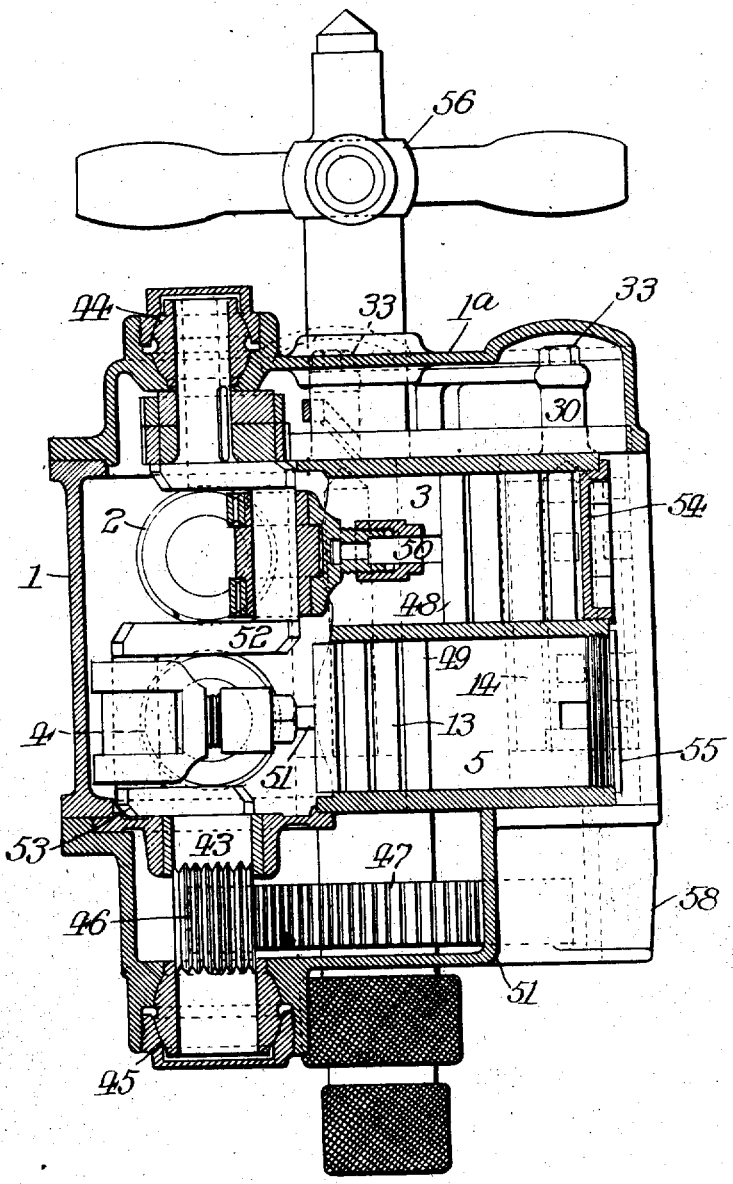

G. H. HAYES.

PNEUMATIC DRILL OR LIKE MACHINE.

APPLICATION FILED AUG. 2, 1906.

Reissued Apr. 30, 1912.

13,410.

5 SHEETS—SHEET 1.

Witnesses:

Wm P. Bond

T. L. Hefferds

Inventor:

George Harry Hayes,

By Rector, Stibbens & Davis

His Attys.

G. H. HAYES.

PNEUMATIC DRILL OR LIKE MACHINE.

APPLICATION FILED AUG. 2, 1906.

Reissued Apr. 30, 1912.

13,410.

5 SHEETS—SHEET 2.

Witnesses:
Wm. P. Bond
T. H. Hyde

Inventor
George Harry Hayes,
By Hector, Hibben & Davis
His Attys.

G. H. HAYES.

PNEUMATIC DRILL OR LIKE MACHINE.

APPLICATION FILED AUG. 2, 1906.

Reissued Apr. 30, 1912.

13,410.

5 SHEETS—SHEET 3.

Witnesses

Wm. P. Bond

T. A. Alfreds

Inventor:

George Harry Hayes

By Rector, Nibben & Dana

His Attys.

G. H. HAYES.

PNEUMATIC DRILL OR LIKE MACHINE.

APPLICATION FILED AUG. 2, 1906.

Reissued Apr. 30, 1912.

13,410.

5 SHEETS—SHEET 4.

Witnesses:
Wm P. Bond
F. A. Alfrede

Inventor
George Harry Hayes
By Pickett, Kinnan & Davis
His Attys.

G. H. HAYES.
PNEUMATIC DRILL OR LIKE MACHINE.
APPLICATION FILED AUG. 2, 1906.
Reissued Apr. 30, 1912.
13,410.
5 SHEETS—SHEET 5.
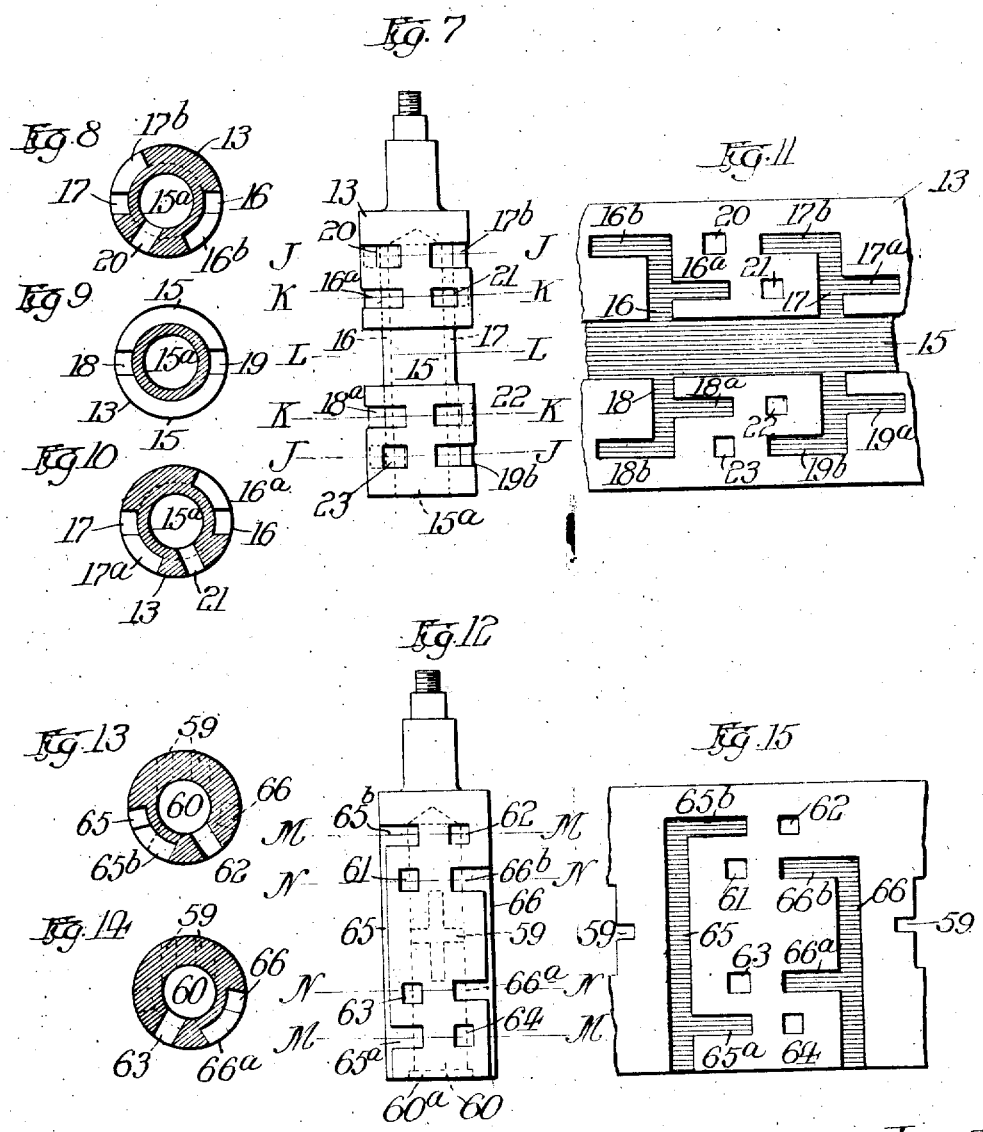
Witnesses:
Wm. P. Bond
C. H. Hfnds
Inventor
George Harry Hayes
By Rector, Nibben & Davis
His Attys:

Draftsman

UNITED STATES PATENT OFFICE.

GEORGE HARRY HAYES, OF CHICAGO, ILLINOIS, ASSIGNOR TO CHICAGO PNEUMATIC TOOL COMPANY, A CORPORATION OF NEW JERSEY.

PNEUMATIC DRILL OR LIKE MACHINE.

13,410. Specification of Reissued Letters Patent. Reissued Apr. 30, 1912.

Original No. 733,960, dated July 21, 1903, Serial No. 133,906. Application for reissue filed August 2, 1906. Serial No. 328,967.

*To all whom it may concern:*

Be it known that I, GEORGE HARRY HAYES, a citizen of the United States, formerly residing in the city and county of London, England, but now residing at Chicago, Cook county, Illinois, have invented certain new and useful Improvements in Pneumatic Drills or Like Machines; and I do hereby declare the following to be a full, clear, and exact description of the invention, such as will enable others skilled in the art to which it appertains to make and use the same.

This invention relates to improvements in hand portable pneumatic drills and like machines, and has for its object to provide a portable machine which is simple in construction, efficient in action, and economical in the use of motive fluid.

My invention consists in an engine of the piston type with fixed cylinders and cylindrical controlling-valves arranged at right angles to or across said cylinders. The pistons of the cylinders are connected, as usual, to the crankshaft, (which latter works the drill-spindle or tool-socket by means of the usual toothed gearing,) and the controlling-valves are actuated by an eccentric or eccentrics on said shaft, being oscillated by said eccentrics during the revolution of the crankshaft, so as to control the admission and exhaust of the fluid-pressure to and from the working cylinders. The controlling-valves are connected, by means of a yoke or otherwise, to a reversing-sleeve on the handle of the machine (or to any other suitable device adapted to be operated by hand) and are thus capable of being directly actuated to reverse the direction of rotation of the crankshaft, said valves having a double set of ports or other convenient port arrangement adapted to coöperate with the air-inlet or the exhaust ports or passages. The controlling-valves may be made either to admit or discharge the pressure through a central passage in the valves, or they may be made to admit or discharge the pressure on the outside of the valves, as hereinafter described.

My invention further consists in the details and combination of parts, as hereinafter more fully set forth. In order that my invention may be readily understood and carried into effect, I will now describe it with reference to the accompanying drawings, in which—

Figure 3:
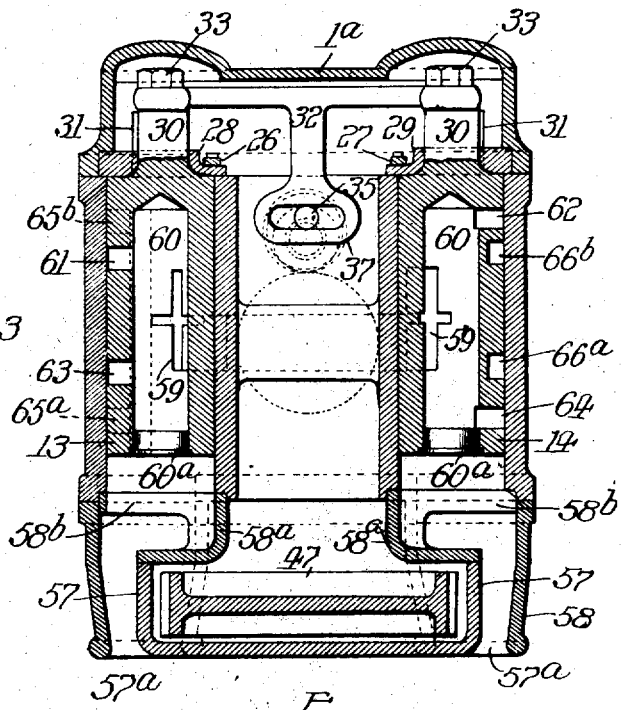
Figure 2:
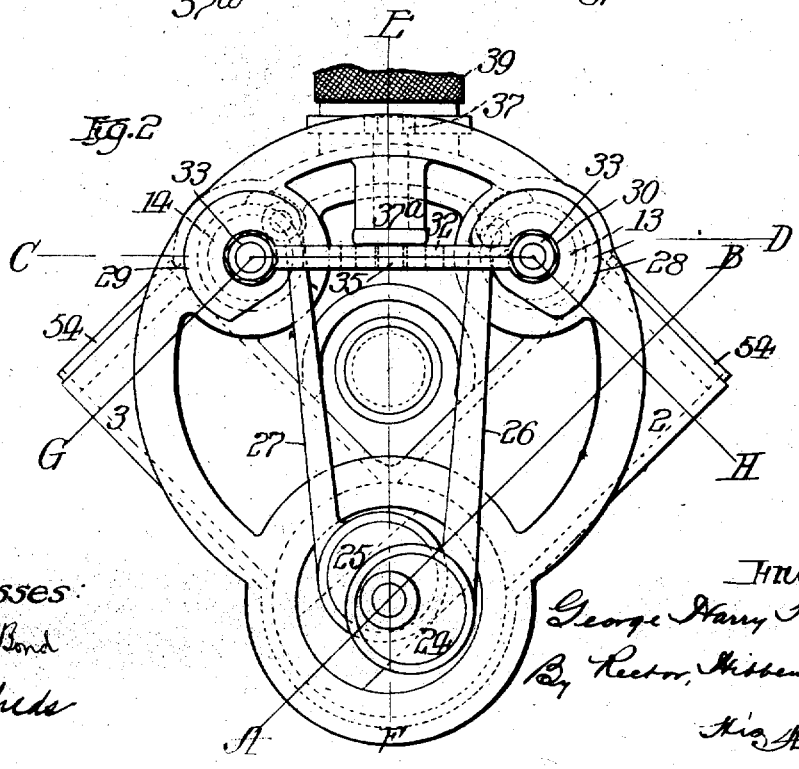
Figure 16:
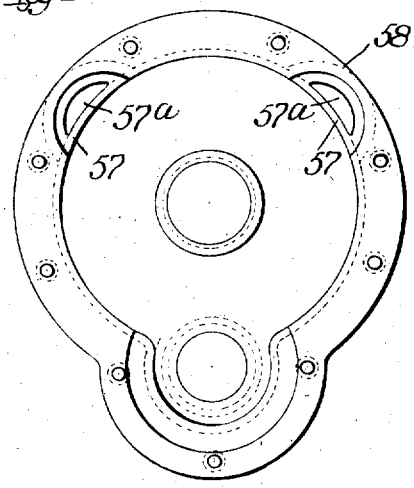
Figure 9:
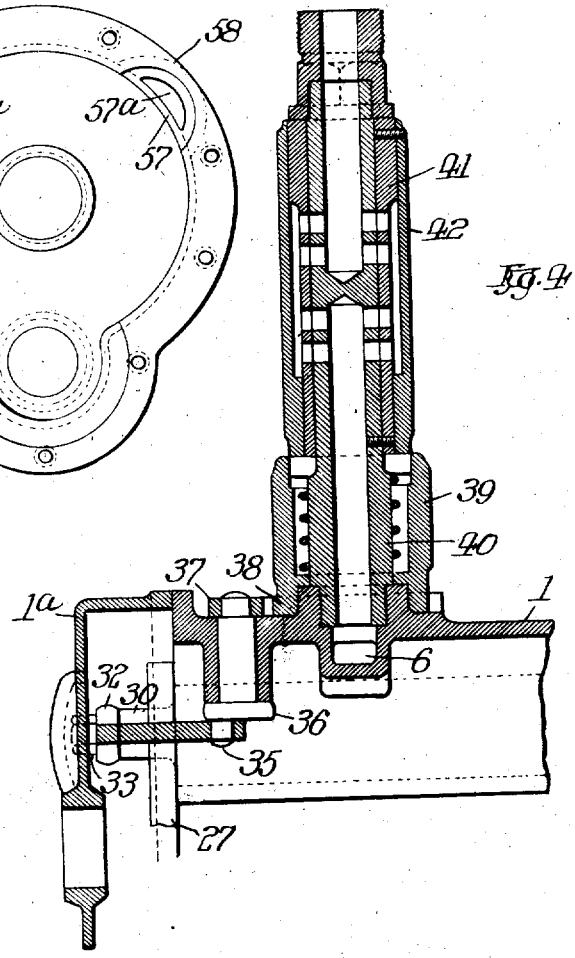
Figure 5:
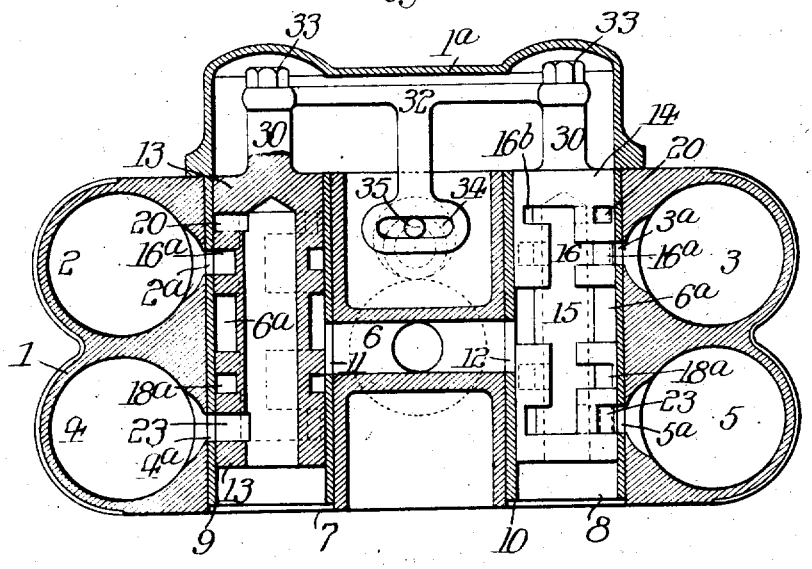
Figure 6:
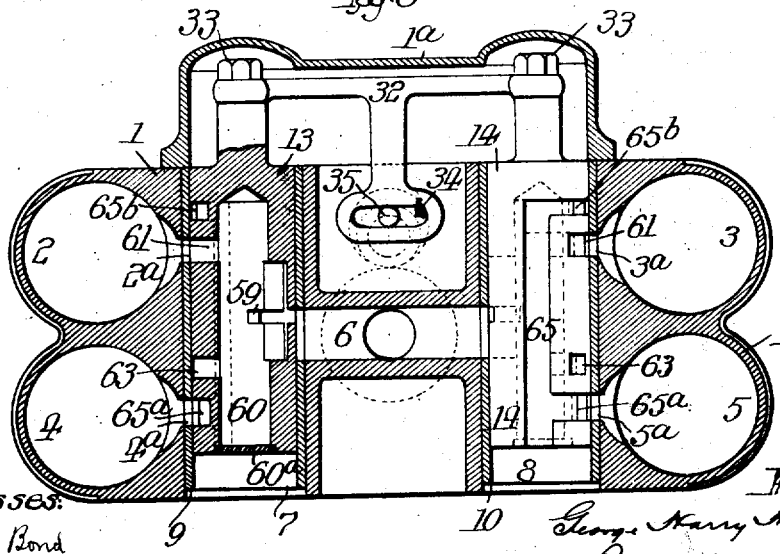

Figure 1 is a sectional elevation of the complete machine, taken on the line A B through the two right-hand cylinders. Fig. 2 is a rear end or top view of the machine with cover removed, showing the eccentrics on the crank-shaft and their connections to the controlling-valves. Fig. 3 is a vertical sectional elevation of the machine-body, taken on line C D of Fig. 2 in the direction of the arrow. Fig. 4 is a part sectional elevation on the line E F of Fig. 2. Fig. 5 is a diagrammatic view taken on line G H of Fig. 2. Fig. 6 is a diagrammatic view also taken on line G H, Fig. 2, but showing the alternative form of controlling-valve. Fig. 7 is an elevation of one of the controlling and reversing valves shown in Fig. 5. Figs. 8 and 9 are sectional plan views taken on lines J J J J and L L of Fig. 7. Fig. 10 is a sectional plan on the lines K K K K of Fig. 7. Fig. 11 is a diagrammatic outlay of the combined controlling and reversing valves shown in Figs. 5 and 7. Fig. 12 is an elevation of the alternative form of controlling and reversing valves shown in Figs. 3 and 6. Fig. 13 is a sectional plan view on lines M M M M of Fig. 12. Fig. 14 is a sectional plan on lines N N N N of Fig. 12. Fig. 15 is a diagrammatic outlay of the combined controlling and reversing valves shown in Figs. 3, 6 and 12. Fig. 16 is a plan view of the gear-case shown in Fig. 3, showing the final exhaust-outlets hereinafter referred to.

The same numbers indicate the same or corresponding parts in the several figures of the drawings.

1 is the main casing or body of the machine, comprising the fluid-pressure cylinders 2 3 4 5 the fluid-pressure chamber or passage 6, and the controlling-valve chambers 7 and 8, all formed in one casting.

1[a] is an end cap or cover screwed in or otherwise attached to the main body 1. The valve-chambers 7 and 8 are arranged transversely, preferably at right angles to the cylinders 2 4 and 3 5, respectively, as clearly shown in Figs. 2, 3, 5, and 6.

9 and 10 are ported valve-bushings respectively in the valve-chambers 7 and 8.

11 and 12 are ports respectively in the bushes 9 and 10.

$2^a$ $4^a$ and $3^a$ $5^a$ are pairs of ports also respectively in the bushes 9 and 10, the former connecting with the corresponding ports of the respective cylinders 2 and 4 and the latter connecting with the corresponding ports of the respective cylinders 3 and 5.

13 and 14 are the controlling-valves, fitted to work respectively in the bushes 9 and 10.

Each of the valves 13 and 14 is provided with a double set of inlet and exhaust passages and (or) ports for controlling the inlet and exhaust of fluid-pressure to and from each cylinder to which said valve applies, one set of said inlet and exhaust passages and (or) ports being employed for admitting fluid-pressure to and exhausting it from the working cylinder for driving the drill-spindle or tool-socket in the normal or right-hand direction, the other set of said ports being employed when working in the reverse direction, as hereinafter described.

The form of valve I prefer to use in practice is shown in detail in Figs. 5, 7, 8, 9, 10, and 11, in which pressure is admitted to the working cylinders through channels or passages in the outside of the valve, and the exhaust takes place through ports leading to a central passage in the valve. In Fig. 5 the valves 13 and 14 and the bushings 9 and 10 are identical in every respect, so that a description of one valve serves for both. In these views Figs. 5, 7, 8, 9, 10, and 11, 15 is a reduced diameter or neck formed in the valve, the space between said neck and the valve-bushing forming a pressure-chamber $6^a$, (in Fig. 5,) to which fluid-pressure is constantly admitted from chamber 6 in the machine-body through the port in the valve-bushing when the throttle-valve controlling the inlet of fluid pressure from the source of supply is held open. Looking at the right-hand valve 14 in Fig. 5 and at Figs. 7 to 11, inclusive, 16 is a channel or passage formed in the face of the valve on one side, and 17 is a similar channel or passage formed in the face of the valve on the other side opposite to 16. The general form of these channels or passages is shown in the view of the right-hand valve 14 in Fig. 3 and also in the outlay of the valve shown in Fig. 11, said passages 16 and 17 being provided, respectively, with branches $16^a$ $16^b$ and $17^a$ $17^b$. Both these passages 16 and 17, with their branches, as above set forth, are inlet-passages for conducting the motive fluid to the working cylinder, (in this case the upper right-hand cylinder 3 in Fig. 5,) the passage 16, for example, being the inlet-passage when the crank shaft is being rotated so as to drive the tool or tool socket in the normal or right-hand direction, the passage 17 being the inlet-passage when working in the reverse direction. There being four fixed cylinders in the type of motor which I prefer to employ, (said cylinders being arranged in pairs in the casing 1, the pairs of cylinders being at right angles to each other and to the crank-shaft,) each controlling-valve (13 and 14, Fig. 5) is arranged to control the inlet and exhaust of fluid-pressure to and from two cylinders forming a pair. For example, in Fig. 5 the valve 14 controls inlet and exhaust of pressure to and from the cylinders 3 and 5, both for normal and reverse working, the pressure-inlet passages marked 18 19) provided opposite to each other in the face of the valve and having (see Figs. 7 and 11) branches $18^a$ $18^b$ and $19^a$ $19^b$, respectively, being the inlet passages for the cylinder 5.

20 and 21 (see Figs. 7 and 11) are the exhaust-ports in the valve, leading to the central exhaust-passage $15^a$ therein for the exhaust of fluid-pressure from cylinder 3, and 22 and 23 are the exhaust-ports in the valve, also connecting with passage $15^a$, for the exhaust of fluid-pressure, from cylinder 5, the ports 21 and 22, for example, being respectively the exhaust-ports for the cylinders 3 and 5 when the pistons of said cylinders are operating the crank-shaft to drive the tool or tool-socket in the normal or right-hand direction, ports 20 and 23 acting to exhaust said cylinders 3 and 5, respectively, when the crank-shaft is working in the reverse direction.

Referring to Figs. 1, 2, and 3, the controlling-valves 13 and 14 are oscillated in their bushings so as to control the inlet and exhaust of fluid-pressure to and from the working cylinders by means of eccentrics, 24 25 on the crank-shaft, the rings on said eccentrics being connected, respectively, by rods 26 27 to collars 28 and 29, respectively, on the valves 13 and 14. These collars are slidably mounted each on a stem (marked 30, see Figs. 3, 5, 6, 7, and 8) on each of the respective valves, said collars being held against rotation with reference to the valve and stem by means of a feather 31 on the stem engaging a groove in the collar. Connected to the stems 30 of both valves is a T-shaped yoke 32, reduced diameters on the stems 30 bearing freely in the ends of the cross bar of said yoke, which is retained on the stems 30 by means of nuts 33, (see Figs. 1, 2, 3, 5, and 6,) screwed on the threaded ends of said stems. A slot 34 is provided in the vertical arm of the yoke 32 with which a pin 35 on a disk or crank 36 engages, said disk being connected to a pinion 37, (see Figs. 2 and 4,) with which a toothed wheel 38 on a sleeve 39 gears. The sleeve 39 is rotatably mounted on the usual hollow handle 40 (see Fig. 4) of the machine, through which the fluid-pressure from the source of supply is admitted to the fluid-pressure chamber 6 in the machine-body.

41 indicates a well-known type of throttle-valve adapted to be actuated by means of a sleeve 42 on handle 40 for opening and closing the fluid-pressure supply. Any other desired or known type of throttle-valve may be employed.

Referring now to Figs. 1 and 2, 43 is the crank-shaft, whose ends bear in end bearings 44 45. 46 is the pinion on the crank-shaft, which pinion gears with gear-wheel 47 on the tool-socket, so as to revolve the latter. 48 49 are the pistons in cylinders 3 and 5, respectively, and 50 51 the piston-rods connecting pistons 48 49, respectively, to the cranks 52 53 on the crank-shaft, the similar piston-rods and pistons of the cylinders 2 and 4 being also connected to said cranks.

54 55 are the well-known screwed-in cylinder-caps, and 56, Fig. 1, is the usual feed-screw head.

At the tool-socket or gearing end of the machine-body or casing 1 is a chamber or gear-case 57, (see Figs. 1 and 3,) screwed on or otherwise attached to casing 1. 58 is a ring or annular section cast in one with the gear-case and screwed on or otherwise attached to the casing 1, the ports or channels (marked $57^a$) formed between said ring 58 and the gear-case 57 being the final exhaust outlets, to the atmosphere, which register with the controlling-valve chambers. $58^a$ is a cover part or neck detachably connected to the machine-body 1 and to the gear-case 57, wire gauze $58^b$ being inserted between the valve-chambers and the final exhaust port $57^a$, said part 58 constituting a receptacle to contain the oil bath for the gearing.

Figs. 1, 3, 6, 12, 13, 14, and 15 show the alternative forms of the combined controlling and reversing valves. The two valves 13 and 14 (shown in Figs. 1, 3, and 6) are identical in every respect, so that it is only necessary to describe one of said valves. With this form of valve the fluid-pressure is admitted to the working cylinders through the interior of the valve and is exhausted from said cylinders by way of channels or passages on the exterior of the valve instead of being admitted through passages on the exterior of the valve and exhausted through the interior of the valve, as described with reference to Figs. 5, 7, 8, 9, 10, and 11.

Referring to Figs. 6, 12 and 15, 59 is the inlet-port, preferably of the form shown, connecting with a central chamber or passage 60 in the valve and also registering with the fluid-pressure chamber or passage 6 in the machine-body 1. A plug or cap $60^a$ closes the lower end of chamber 60. 61 62 are inlet-ports leading from the central chamber 60 and adapted to register with the inlet-port $3^a$, leading into cylinder 3, port 61, for example, acting for the inlet of fluid-pressure to the cylinder when the motor is driving the tool in the normal or right-hand direction and port 62 acting for inlet when the motor is working the tool in the reverse direction. 63 64 are inlet-ports leading from the central chamber 60 and adapted to register with the inlet-port $5^a$ to the cylinder 5, (see Fig. 6,) port 64, for example, being employed for the inlet of fluid-pressure to said cylinder when the machine is working in the normal or right-hand direction and ports 63 acting for inlet when working in the reverse direction. 65 and 66 are the exhaust channels or passages on the face of the valve, the passages 66 and 65 acting, for example, respectively, for exhaust of pressure from both cylinders 3 and 5 when the motor is running in the normal direction and, vice versa, passages 65 and 66 acting for exhaust, respectively, from cylinders 3 and 5 when working in the reverse direction. The general form of these exhaust-passages is shown in Fig. 15, said passages 65 and 66 having branches $65^a$ $65^b$ and $66^a$ $66^b$, respectively.

The working may be briefly described as follows: Assuming the motor to be operating the tool in the left-hand direction and referring first to Fig. 5, which shows the form of valve for taking the fluid-pressure on the outside and exhausting through the center of the valve, the right-hand valve 14 is in the position to which it has been oscillated by the eccentric 25 on the crank-shaft, in which its passage 16 is just about to admit fluid-pressure to the cylinder 3, said pressure being admitted (by opening throttle-valve 41, Fig. 4) to the chamber or passage 6 in the machine-body 1, thence through port 12 in the valve bushing 10 into the space in the valve-chamber between said bushing and the neck 15 on the valve, and thence by way of channel or passage 16 and its branch $16^a$ to the port $3^a$, leading into cylinder 3, the pressure also passing up channel 16 into its branch $16^b$, which latter in this case acts as a pressure-balancing area. At the same time the fluid-pressure in cylinder 5 has just commenced to exhaust through the port 22, leading into the central passage 15 of the valve 14, whence it passes to the atmosphere through the open end of said valve and out through the open space $57^a$ (see Fig. 3) in the gear-case end of the machine-body. Also at the same time the left-hand valve 13 has been oscillated, so that its inlet-passage 16 is fully opened to the port $2^a$ (or, in other words, ports $2^a$ is fully uncovered or opened to passage 16,)

leading into cylinder 2, so that the piston in this cylinder has received its full fluid-pressure and the valve 13 is about to be moved or oscillated to the position for permitting exhaust of air from the cylinder through the exhaust-port 21 (see Figs. 7 and 11) and central passage 15 in valve 13 and thence out through space 57[a], Fig. 3, to the atmosphere, and cylinder 4 is now fully opened to exhaust through exhaust port 23 and central passage 15 of valve 13, and thence through final exhaust-outlet 56[a]. Now as the crank-shaft is revolved the valves 13 and 14 will continue to be oscillated, through the connecting-rods 26 27 to the eccentric 24, 25, so that inlet passage 16 16[a] of right-hand valve 14 will be fully opened to cylinder 3 through port 3[a], and exhaust port 23 of said valve will be fully opened to cylinder 5 through port 5[a], while the inlet-passage 16 16[a] of left-hand valve 13 will be closed to cylinder 2 by the face of the valve, and the exhaust-port 21 of said valve will be opened to said cylinder through port 2[a], the exhaust-port 23 being cut off from cylinder 4 by the face of the valve, and the inlet passage 19 19[b] will be opened to cylinder 4 through port 4[a], the branch 19[a] in this case acting as a pressure-balancing area. As the machine continues to operate the tool in the left-hand direction the valves will continue to be oscillated, so that the pressure-inlet passages and exhaust-port above described will be alternately caused to register with the ports directly connecting with the respective cylinders, so as to admit pressure to and exhaust it from the cylinders at the proper times. If now it is desired to operate the tool in the reverse or right-hand direction, the direction of operation of the crank-shaft 43 being also reversed, the operator turns the sleeve 39 in the direction of the arrow, Fig. 4, thus through the gear-wheel 38 on said sleeve engaging the pinion 37 on the spindle or shaft 37[a]. The disk 36, (or crank, as the case may be,) fixed in said shaft, is also revolved, so that the pin 35 on said disk bears on the lower side of slot 34 and so depresses the yoke 32, which latter being connected to the stems 30 of the valves 13 and 14 moves said valves down or to the position in which the inlet-passages 17 18 and the exhaust-ports 20 22 of the valves 13 and 14 can register with the ports 3[a] 5[a] and 2[a] 4[a] leading, respectively, into the cylinders 3 and 5 and 2 and 4, so that now when the valves 13 and 14 are oscillated, as before described, inlet-passage 17 17[b] and exhaust-port 20 of right-hand valve 14 will be alternately caused to register with the port 3[a], leading to and from the cylinder 3, branch 17[a] acting as a balancing area, while inlet-passage 18 18[a] and exhaust-port 22 of said valve will be alternately caused to register with the port 5[a], leading to and from cylinder 5, the branch 18[b] in this case acting as a balancing area, and at the same time the corresponding passages and ports of the left-hand valve 13, Fig. 5, will alternately register with the ports leading to and from the cylinders 2 and 4.

The working of the form of valve shown in Figs. 3, 6, 12, 13, 14, and 15 will now be readily understood. Referring to the right-hand valve 14 in Fig. 6 and assuming the tool to be working in the left-hand direction, as the valves are oscillated the inlet-port 61 and the exhaust-passage 66[b] 66 will be alternately caused to register with the port leading into and out of cylinder 3, and the inlet-port 64 and exhaust-passage 65[a] 65 will be alternately caused to register with the port leading into and out of the cylinder 5. The corresponding ports and passages of the left-hand valve are also caused to alternately register with the respective ports leading into and out of cylinders 2 and 4. If now it is desired to reverse the revolution of the tool and crank-shaft, the valves 13 and 14 will be moved down (by operating yoke 32 by sleeve 39, as already described) to the position in which the other set of inlet-ports and exhaust-passages can register with the respective ports leading into and out of the cylinders, so that now as the valves are oscillated the inlet port 62 and exhaust-passage 65[b] 65 will be caused to alternately register with the port 3[a] of cylinder 3, while the inlet port 63 and exhaust-passage 66[a] 66 will be caused to alternately register with the port 5[a] of the cylinder 5. The corresponding inlet-ports and exhaust-passages of the left-hand valve 13 will likewise be caused to alternately register with the respective ports of cylinders 2 and 4.

The arrangement of the cylinders and valves is such that a certain part of the stroke of the pistons in the cylinders fluid-pressure will be acting on the pistons in two diagonally opposite cylinders—for example, cylinders 2 and 5, Figs. 5 and 6—while at the same time the fluid-pressure will be exhausting from the other two diagonally opposite cylinders 3 and 4.

What I claim, and desire to secure by Letters Patent, is—

1. A portable pneumatic motor comprising a plurality of sets of power-cylinders, arranged at an angle to each other, pistons in said cylinders, a crank-shaft with which the said pistons are connected, the cylinders of each set being parallel with each other and having their central axes in a plane which is radial with respect to the axis of the crank-shaft, valves for said cylinders embracing rotative valve-plugs the central axes of which are parallel with the axis of the crank-shaft and each of which is common to all of the cylinders of one set of cylinders, and operative connections between the crank-shaft and said valve-plugs for actuating the latter.

2. A portable pneumatic motor comprising a plurality of sets of power-cylinders arranged at an angle to each other, pistons in said cylinders and a crank-shaft with which the said pistons are connected, the cylinders of each set being parallel with each other and having their central axes in a plane which is radial to the axes of the crank-shaft, and rotative valves, embracing valve-plugs, the central axes of which are parallel with the axis of the crank-shaft and each of which is common to all of the cylinders of one set of cylinders, said valve-plugs each having a plurality of sets of valve ports or passages, one set for each cylinder of its associated set of cylinders, and operative connections between the crank-shaft and the said valve-plugs for giving motion to the latter.

3. A portable pneumatic motor comprising a casing which is provided with a plurality of sets of power-cylinders arranged at an angle to each other, a supply-chamber for the pressure fluid, and valve-chambers interposed between said supply-chamber and the said sets of power-cylinders, the cylinders of each set having their central axes parallel with each other and in a plane which is radial to the axis of the crank-shaft, rotative plug-valves located in said valve chambers, each of which is common to all of the cylinders of one set of cylinders and the central axes of which are parallel with the axis of the crank-shaft, said plug-valves each having a plurality of sets of valve ports or passages, one for each cylinder of its associated set of cylinders, and operative connections, between the crank-shaft and the said valve-plugs for giving motion to the latter.

4. A portable pneumatic motor comprising a casing provided with a plurality of sets of power-cylinders, pistons in said cylinders and a crank-shaft with which said pistons are connected, the cylinders of the several sets having their central axes in planes which are radial with respect to the axis of the crank-shaft and are at an angle to each other, said casing being also provided between the outer ends of the cylinders, with a supply-chamber for the pressure fluid, located between the outer ends of said cylinder and also having, between said supply-chamber and the cylinders, cylindric valve chambers the central axes of which are at right angles to the axes of the cylinders and parallel with the crank-shaft, rotative valve-plugs located in said chambers, said valve-plugs each having a plurality of sets of valve ports or passages, one for each of the cylinders associated therewith, and the valve-casing having ports or passages leading from the said supply-chamber to the said valve-chambers and connections between the crank-shaft and the said valve-plugs for giving motion to the latter.

5. A portable pneumatic motor comprising a casing which is provided with a plurality of sets of power-cylinders, pistons in said cylinders, and a crank-shaft with which the said pistons are connected, the cylinders of the several sets having their central axes in planes which are radial to the axis of the crank-shaft and are at an angle to each other, rotative valve-plugs which are common to all of the cylinders of one set, and the central axes of which are parallel with the axis of the crank-shaft, said valves each having a plurality of sets of valve ports or passages one for each cylinder of the associated set of cylinders, eccentrics on the said crank-shaft, actuating arms on said valve-plugs, and means connecting said eccentrics with said arms for giving oscillatory motion to the valve-plugs.

6. A portable pneumatic motor comprising a casing provided with a power-cylinder and a pressure-fluid-supply chamber, a crank-shaft, a piston in the cylinder connected with the crank-shaft, an oscillatory valve-plug mounted in the casing parallel with the crank-shaft, and a valve-chamber for said plug-valve, the wall of which constitutes part of the wall of the said supply-chamber, said chamber being provided with a port or opening connecting the same with said supply-chamber, and with another port or opening connecting the same with the cylinder, and the valve-plug being provided with an admission and an exhaust port, said admission-port being adapted to communicate with both of said ports or openings in the valve-casing.

7. A portable pneumatic motor comprising a crank-shaft, a power-cylinder, a valve for controlling the admission of pressure fluid to and its exit from said cylinder, said valve embracing a rotative valve-plug the axis of which is at right angles to the central axis of the cylinder and parallel with the crank-shaft, an admission-port in said valve-plug through which pressure fluid is admitted to the outer end of the cylinder and an exhaust-port in said plug connected with an exhaust-passage which extends longitudinally through the plug and opens through one end of the same.

8. A portable pneumatic motor comprising a main casing provided with two sets of parallel cylinders arranged at an angle to each other and with a supply-chamber located between the cylinders, a crank-shaft, pistons in the cylinders connected with the crank-shaft, oscillatory valve-plugs mounted in the casing parallel with the crank-shaft between the said supply-chambers and the cylinders and actuating means for the said valve-plugs embracing eccentrics on the crank-shaft, actuating-arms mounted in the casing and connected with the valve-plugs, and operative connections between the said eccentrics and the said actuating-arms.

9. In a hand portable pneumatic tool of the type set forth, a fluid-pressure cylinder, a piston working therein, a crank-shaft connected to said piston, an oscillating controlling and reversing valve consisting of a single part arranged across or at right angles to said cylinder, a sleeve on the machine-handle, and means operatively connecting said valve and the sleeve whereby the valve may be moved longitudinally for the purpose of reversing the revolution of the crank-shaft and tool.

10. In a portable pneumatic tool comprising at least two sets of fluid-pressure cylinders and the cylinders in one set arranged substantially at right angles with the cylinders in the other set, a central transverse fluid-pressure passage in the machine-body between the sets of cylinders, two controlling-valve chambers between and at right angles to the sets of cylinders and to the fluid-pressure passage, a partially-rotating cylindrical valve in each chamber, means on the crank-shaft for oscillating said valves so as to control the admission of fluid-pressure to and its exhaust from the cylinders, and means on the machine-handle operatively connected to said valves so as to move both valves simultaneously for reversing the working of the machine, substantially as set forth.

11. A hand portable pneumatic tool, having a main casing or body comprising at least four fluid-pressure cylinders arranged in pairs, two controlling-valve chambers arranged transversely to and between the pairs of cylinders, a central transverse fluid-pressure passage connecting directly with the valve chambers and with the pressure-inlet in the machine-handle, an oscillating controlling and reversing valve in each chamber for controlling the admission of pressure to and its exhaust from a pair of cylinders, a collar slidably mounted on each valve and held against rotation on the valve, means connecting said collars with eccentrics on the crank-shaft, and a T-shaped yoke connecting said valves and itself operatively connected to a sleeve on the machine-handle, substantially as described.

12. In a portable pneumatic tool, the combination of multiple cylinders, pistons working in said cylinders, a crank-shaft connected to said pistons, an oscillating, controlling and reversing valve, consisting of a hollow part arranged transversely to said cylinders, and having a double set of inlet-ports and a double set of exhaust-ports connecting with the fluid-supply and the exterior of the casing respectively, means connecting the crank-shaft with the valve for oscillating the latter, and means connected with the machine-handle for moving the valve longitudinally to reverse the operation of the machine, substantially as described.

13. In a portable pneumatic tool, the combination of multiple cylinders, pistons working in said cylinders, a crank-shaft connected to said pistons, an oscillating, controlling and reversing valve, consisting of a hollow part arranged transversely to said cylinders, and having a double set of inlet ports on the exterior of the valve and a double set of exhaust-ports, connecting with the interior of the valve, means connecting the crank-shaft with the valve for oscillating the latter, and means connected with the machine-handle for moving the valve longitudinally to reverse the operation of the machine, substantially as described.

14. In a portable pneumatic tool, an oil-bath gear-case comprising an annular section or part 58 detachably connected to the machine-body, an annular cover part or neck 58[a] detachably connected to the machine-body and to the gear-case, and fluid-pressure exhaust-ports in the gear-case and cover said ports registering with the controlling-valve chambers in the machine-body, substantially as described.

GEORGE HARRY HAYES.

Witnesses:
S. E. HIBBEN,
LOUIS B. ERWIN.

Copies of this patent may be obtained for five cents each, by addressing the "Commissioner of Patents, Washington, D. C."